C. Bixler.
Culinary Device.

N°26,879. Patented Jan. 24, 1860.

Witnesses:
John Garver
F. Dingledine

Inventor:
C. Bixler

UNITED STATES PATENT OFFICE.

C. BIXLER, OF ROGERSVILLE, OHIO.

LARD-EXPRESSER.

Specification of Letters Patent No. 26,879, dated January 24, 1860.

*To all whom it may concern:*

Be it known that I, C. BIXLER, of Rogersville, in the county of Tuscarawas and State of Ohio, have invented a new and useful Implement for Expressing Lard from Cracklings; and I do hereby declare that the following is a full, clear, and exact description of the same, reference being had to the annexed drawings, making a part of this specification, in which—

Figure 1:
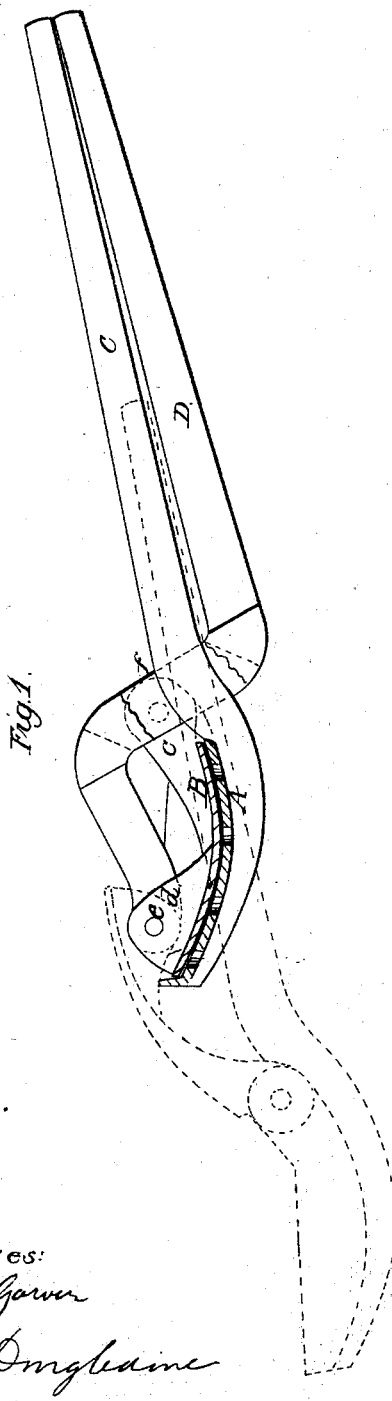
Figure 2:
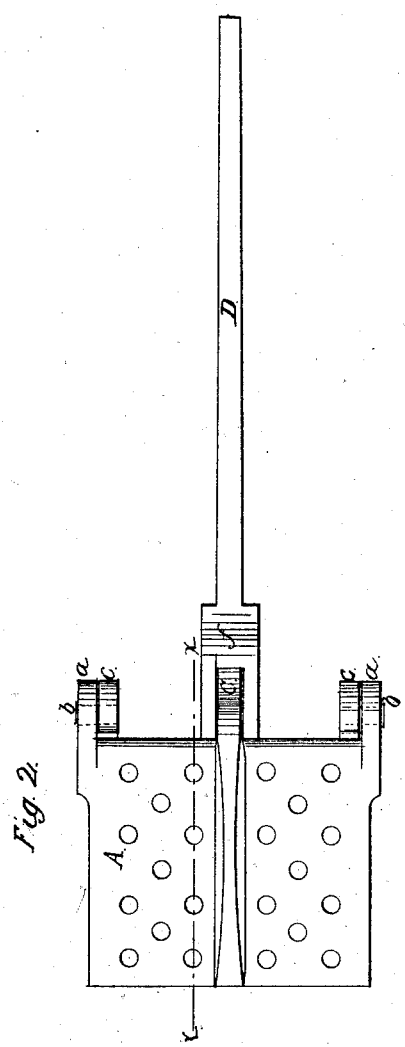

Figure 1, is a side sectional view of my invention, taken in the line $x$, $x$, Fig. 2; Fig. 2, an inverted plan of the same.

Similar letters of reference indicate corresponding parts in the two figures.

The object of this invention is to obtain a simple implement for expressing lard from pork scraps technically termed cracklings; one that may be manipulated with facility, perform the work effectually and greatly expedite the process.

The invention consists in having a perforated box or strainer provided with a handle and having a pressure plate hinged thereto, the pressure plate being also provided with a handle which is slotted and through which the handle of the strainer passes; the parts being arranged as hereinafter fully shown and described, whereby the strainer may be fully exposed to receive the cracklings, the pressure plate readily adjusted over them and the pressure advantageously applied.

To enable those skilled in the art to fully understand and construct my invention I will proceed to describe it.

A, represents a perforated box or strainer which is simply a scoop shaped receptacle provided at its back part with lugs or projections $a$, $a$, one at each side, said lugs or projections forming bearings for pintles $b$, which pass through lugs or projections $c$, $c$, at the back part of a plate B, and form joints which connect the plate and strainer A.

The strainer A, may be of cast iron and with it a handle C, is cast, said handle extending a sufficient distance from the back of the strainer. The plate B, is somewhat curved corresponding to the form of the strainer as shown clearly in Fig. 1. The plate B, however is solid and is of such dimensions that it may readily pass within the strainer.

To the upper side of the plate B, there are lugs $d$, between which one end of a handle D, is secured by a pintle $e$. This handle D, has a quick bend $f$, in it which bend is slotted to allow the handle C, to pass through and allow the outer part of handle D, to be below C, and the plate B, to be on or within the strainer, the slotted bend $f$, also serving as a fulcrum socket for the handles, no fulcrum pin being used.

In using the implement the handles C, D, are distended or spread apart so as to raise the plate B, from the strainer A; the handle D, of the plate B, is then drawn back or the handle C, shoved forward and the plate B, will thereby be thrown back on the handle C, so as to leave the strainer A, fully exposed, as shown in red Fig. 1. By this arrangement the strainer is fully exposed to receive the cracklings and when a sufficient quantity is placed in the strainer, the plate B, is shoved forward and on the cracklings and the handles C, D, are then pressed together which causes the plate B, to compress the cracklings and express the lard therefrom, the latter passing through the perforations of the strainer.

This implement may be constructed at a small cost and it will last indefinitely as there are no parts liable to get out of repair. With handles of proper length a good leverage power may be obtained so as to render the implement very efficient.

Having thus described my invention what I claim as new and desire to secure by Letters Patent, is,

The strainer A, and pressure plate B, connected by hinges or joints and provided with handles C, D, arranged as shown and described to form a new and useful article of manufacture for the purpose specified.

C. BIXLER.

Witnesses:
 JOHN GARVER,
 S. DINGLEMIRE.